United States Patent
Tamura et al.

(10) Patent No.: US 8,418,553 B2
(45) Date of Patent: Apr. 16, 2013

(54) BIAXIAL ANGULAR VELOCITY SENSOR

(75) Inventors: Masahide Tamura, Toyama (JP);
Hidekazu Yano, Toyama (JP)

(73) Assignee: Hokuriku Electric Industry Co., Ltd., Toyama-Shi (JP)

(*) Notice: Subject to any disclaimer, the term of this patent is extended or adjusted under 35 U.S.C. 154(b) by 268 days.

(21) Appl. No.: 13/000,689

(22) PCT Filed: Jun. 18, 2009

(86) PCT No.: PCT/JP2009/061084
§ 371 (c)(1),
(2), (4) Date: Dec. 22, 2010

(87) PCT Pub. No.: WO2009/157362

PCT Pub. Date: Dec. 30, 2009

(65) Prior Publication Data

US 2011/0100122 A1    May 5, 2011

(30) Foreign Application Priority Data

Jun. 23, 2008 (JP) ................................. 2008-163286

(51) Int. Cl.
*G01C 19/56* (2012.01)
(52) U.S. Cl.
USPC .................................. 73/504.12; 73/504.16
(58) Field of Classification Search .............. 73/504.12, 73/504.15, 504.16, 504.04, 504.03; 310/316.01, 310/367, 321
See application file for complete search history.

(56) References Cited

U.S. PATENT DOCUMENTS

| | | | |
|---|---|---|---|
| 5,847,487 A | 12/1998 | Maeno | |
| 6,201,341 B1 | 3/2001 | Fujimoto | |
| 7,210,350 B2 * | 5/2007 | Ogura | 73/504.12 |
| 2001/0001928 A1 * | 5/2001 | Kikuchi et al. | 73/504.12 |
| 2005/0061073 A1 * | 3/2005 | Kanna et al. | 73/504.04 |
| 2005/0284223 A1 * | 12/2005 | Karaki et al. | 73/504.12 |
| 2006/0162447 A1 * | 7/2006 | Ogura | 73/504.12 |

FOREIGN PATENT DOCUMENTS

| | | |
|---|---|---|
| FR | 2883370 | 9/2006 |
| JP | 07-113642 | 5/1995 |
| JP | 08-271256 | 10/1996 |
| JP | 11-006737 | 1/1999 |
| JP | 11-351880 | 12/1999 |
| JP | 2000-304544 | 11/2000 |
| JP | 2002-350138 | 12/2002 |

* cited by examiner

*Primary Examiner* — Helen Kwok
(74) *Attorney, Agent, or Firm* — Rankin, Hill & Clark LLP

(57) ABSTRACT

A biaxial angular velocity sensor provided herein has good detection sensitivity and allows an oscillator to be fixed stably. The biaxial angular velocity sensor includes an oscillator (3) made of a non-piezoelectric material, an electromechanical energy converting element (23) for driving and electromechanical energy converting element (25) for detection, both of which are provided in the oscillator (3), a plurality of drive electrodes (27) provided corresponding to the electromechanical energy converting element (23) for driving, and a plurality of detection electrodes (29) provided corresponding to the electromechanical energy converting element (25) for detection. The oscillator (3) includes a central portion (5) located in the center of the oscillator and eight first to eighth arm portions (7) to (21). The distal end portions of the fifth to eighth arm portions (15) to (21), located on the opposite side to the central portion (5), are fixed.

18 Claims, 7 Drawing Sheets

BIAXIAL ANGULAR VELOCITY SENSOR

TECHNICAL FIELD

The present invention relates to a biaxial angular velocity sensor for detecting a biaxial angular velocity.

BACKGROUND ART

As a conventional technique for camera shake correction or image stabilization in photographing a digital image, two uniaxial angular velocity sensors are incorporated in a product such as a digital camera so as to detect a biaxial angular velocity. When the uniaxial angular velocity sensors are incorporated, it is necessary to ensure a region for incorporating the two sensors, thereby causing a problem with downsizing the product difficult.

A biaxial angular velocity sensor disclosed in Japanese Patent No. 3,492,010 (JP3492010) uses cross-shaped oscillator having first and second arm portions extending along an X axis from a fixedly supported central portion in mutually opposite directions and third and fourth arm portions extending along a Y-axis orthogonal to the X axis from the fixedly supported central portion in mutually opposite directions. The oscillator is formed in such a way that an electromechanical energy converting element is overlaid each on the first to fourth arm portions. Further, a plurality of drive electrodes for applying a voltage to the electromechanical energy converting elements are disposed on the oscillator so as to oscillate the oscillator in such a way that the first to fourth arm portions are displaced in a Z-axis direction orthogonal to the X and Y axes. Further, a plurality of detection electrodes are disposed on the first to fourth arm portions of the oscillator. The detection electrodes detect, from the electromechanical energy converting elements, voltages corresponding to displacements of the first to fourth arm portions due to respective angular velocities of the first to fourth arm portions around the X and Y axes while the oscillator is being excited. In the biaxial angular velocity sensor having the above configuration, when a voltage is applied to the drive electrodes disposed on the first to fourth arm portions, the respective arms of the oscillator are oscillated in the Z-axis direction. In this state, when the oscillator is moved in the X and Y axes directions or acceleration is generated, the respective arms are rotated, namely, angular velocities are generated around the X and Y axes by means of the Coriolis force. The angular velocities thus generated are detected from the outputs of the detection electrodes disposed on the arm portions. Then, the accelerations of the oscillator in the X and Y axes directions are measured from the detected angular velocities. In the above biaxial angular velocity sensor, the first to fourth arm portions are integrally formed, which helps downsizing of a product.

DISCLOSURE OF THE INVENTION

Technical Problem

However, in the conventional biaxial angular velocity sensor disclosed in JP3492010, the central portion of the oscillator is fixed, and accordingly only the first to fourth arm portions may be oscillated in the Z-axis direction. Therefore, only the angular velocities around the X and Y axes corresponding to the oscillation ranges of the four arm portions may be detected. As a result, if the accelerations of the oscillator in the X-axis and Y-axis directions are small, there is a limit to an increase in the detection sensitivity of angular velocities around the X and Y axes. Here, in order to increase the sensor sensitivity, the oscillator may be designed such that a large oscillation is applied to the oscillator in the Z-axis direction so as to obtain an angular velocity as high as possible. However, in the configuration in which the four arms are fixedly supported only at one portion, i.e., central portion of the oscillator, as the oscillation range and angular velocity becomes larger, the fixed state of the oscillator becomes unstable. Further, impact due to oscillation of the first to fourth arm portions in the Z-axis direction and impact due to angular velocities around the X and Y axes are propagated concentratedly to the central portion of the oscillator, so that thermal strain occurring in the central portion, which is fixedly supported, of the oscillator becomes more pronounced.

An object of the present invention is to provide a biaxial angular velocity sensor capable of increasing the oscillation range of the oscillator in the Z-axis direction.

Another object of the present invention is to provide a biaxial angular velocity sensor capable of stably fixing the oscillator when the oscillation range and angular velocity of the oscillator become large.

A further object of the present invention is to provide a biaxial angular velocity sensor capable of reducing thermal strain occurring in the portion fixedly supported.

Solution to Problem

A biaxial angular velocity sensor of a first type according to the present invention includes an oscillator made of a non-piezoelectric material, a plurality of electromechanical energy converting elements disposed on the oscillator, a plurality of drive electrodes disposed corresponding to the electromechanical energy converting, elements, and a plurality of detection electrodes disposed corresponding to some of the plurality of electromechanical energy converting elements. As the non-piezoelectric material used to form the oscillator typically includes an electronic component material such as silicon which is easy to be etched.

The oscillator used in the present invention includes first to eighth arm portions and a central portion positioned at the center thereof. The first and second arm portions extend from the central portion along an X axis in mutually opposite directions. The third and fourth arm portions extend from the central portion in mutually opposite directions along a Y-axis orthogonal to the X axis. The fifth and sixth arm portions extend from the central portion in mutually opposite directions along a first X-Y axis passing through the center of the central portion between the X and Y axes, and each have a distal end portion fixedly supported. The seventh and eighth arm portions extend from the central portion in mutually opposite directions along a second X-Y axis orthogonal to the first X-Y axis, and each have a distal end portion fixedly supported. The X and Y axes in the specification of the present application are virtual axes defined for explaining the configurations of the first to fourth arm portions of the present invention. The first and second X-Y axes are virtual axes extending on a virtual plane including the X and Y axes, which are defined for explaining the configurations of the fifth to eighth arm portions of the present invention.

The plurality of electromechanical energy converting elements include a plurality of electromechanical energy converting elements for driving and a plurality of electromechanical energy converting elements for detection. The plurality of electromechanical energy converting elements for driving are disposed on the first to eighth arm portions. The plurality of electromechanical energy converting elements for detection are disposed on the first to fourth arm portions. The electromechanical energy converting elements for driving may be disposed on the surfaces of the first to eighth arm portions or disposed inside the respective arm portions to form a layered structure. The electromechanical energy converting elements for driving and electromechanical energy converting elements for detection may be formed using, for example, a piezoelectric material such as Lead Zirconate Titanate (PZT). The electromechanical energy converting elements for driving have a function of converting electrical energy into mechanical energy through the first to eighth arm portions of the oscillator so as to obtain drive energy required for oscillating the oscillator in a Z-axis direction as described later. The electromechanical energy converting elements for detection have a function of converting into the electrical energy the energy of rotational motion or angular velocity generated as the Coriolis force when the oscillator is moved oscillating.

The plurality of drive electrodes are disposed corresponding to the plurality of electromechanical energy converting elements for driving disposed on the first to eighth arm portions. The drive electrodes are configured to allow a voltage to be applied when the oscillator is excited so as to displace the central portion of the oscillator in the Z-axis direction orthogonal to the X and Y axes. The Z axis in the specification of the present application is a virtual axis extending in the direction orthogonal to the virtual plane including the X and Y axes, and is defined for explaining the direction in which the oscillator is excited or oscillated. If the oscillator made of a non-piezoelectric material is used as in the present invention, the drive electrode may be formed of two electrode layers and the electromechanical energy converting element for driving may be sandwiched between the two electrode layers of the drive electrode. Then, the thus sandwiched electromechanical energy converting element for driving is disposed on the surface of each of the first to eighth arm portions. In this configuration, when a voltage is applied to the drive electrodes, the electromechanical energy converting elements for driving each sandwiched between the two electrode layers are excited in the Z-axis direction and accordingly the first to eighth arm portions are oscillated in the Z-axis direction, with the result that the entire oscillator including the central portion is oscillated.

The plurality of detection electrodes are disposed corresponding to the plurality of electromechanical energy converting elements for detection disposed on the first to fourth arm portions. When the oscillator made of a non-piezoelectric material is used as in the present invention, similar configurations to the electromechanical energy converting elements for driving and drive electrodes may be employed. That is, the detection electrode may be formed of two electrode layers and the electromechanical energy converting element for detection, which is a piezoelectric thin-film layer, may be sandwiched between two electrode layers of the detection electrode. Then, the thus sandwiched electromechanical energy converting element for detection is disposed on the surface of each of the first to fourth arm portions. The detection electrodes output voltages corresponding to displacements of the first to fourth arm portions due to respective angular velocities of the first to fourth arm portions around the X and/or Y axes while the oscillator is being excited.

In the biaxial angular velocity sensor configured as described above, an angular velocity is detected as follows. When a voltage is applied to the plurality of drive electrodes disposed on the first to eighth arm portions, the oscillator is oscillated in the Z-axis direction. In this state, when the oscillator is moved, or acceleration is generated in the X-axis direction and/or Y-axis direction, the Coriolis force is generated around the X axis and/or Y axis, causing the first and second arm portions and/or the third and fourth arm portions to be rotated around the X axis and/or Y axis, thereby generating the angular velocity. Then, the angular velocities are acquired, as voltages corresponding to displacements of the rotational motion, from the plurality of detection electrodes disposed on the first to fourth arm portions, whereby the displacement of the oscillator, specifically the first to fourth arm portions, is detected. Then, the accelerations of the oscillator in the X-axis direction and/or Y-axis direction may be measured by converting the detected displacements or voltages corresponding, to the displacements of the oscillator, specifically the first to fourth arm portions, into the accelerations of the oscillator in the X-axis direction and/or Y-axis direction.

Particularly, in the biaxial angular velocity sensor according to the present invention, not only the first to fourth arm portions of the oscillator but also the fifth to eighth arm portions are oscillated in the Z-axis direction, and the central portion of the oscillator is not fixed. Accordingly, the entire oscillator including the central portion may be oscillated in the Z-axis direction with a large oscillation range. As a result, even if the accelerations of the oscillator in X-axis direction and/or Y-axis direction are small, high angular velocity may be obtained, thereby enhancing the sensor detection sensitivity.

Further, the distal end portions of the fifth to eighth arm portions are fixedly supported at the positions opposite to the central portion of the oscillator. Accordingly, the oscillator may be supported at the four fixed portions, the distal end portions of fifth to eighth arm portions, through the central portion and four arm portions, the fifth to eighth arm portions. Therefore, even if the oscillation range of the oscillator, specifically the first to eighth arm portions and central portion, in the Z-axis direction becomes large and even if the rotational motions or angular velocities of the oscillator, specifically the distal end portions of the first to fourth arm portions around the X axis and/or Y axis become large, the oscillator may be maintained in a stable fixed state.

Further, in the biaxial angular velocity sensor according to the present invention, the distance from each of the first to fourth arm portions to each of the four fixed portions, namely the distal end portions of the fifth to eighth arm portions, is larger than the distance from the arm portion of the oscillator to the central portion, which is a fixed portion, in a conventional biaxial angular velocity sensor in which the central portion of the oscillator is fixed. Thus, impact due to the oscillation of the oscillator, specifically the first to fourth arm portions, in the Z-axis direction and impact due to rotational motions or angular velocity around the X axis and/or Y axis are difficult to be propagated to the fixed portions of the oscillator. In addition, the above-mentioned impacts may be propagated to the four fixed portions, namely, the distal end portions of the fifth to eighth arm portions, and distributed among these four distal end portions. As a result, the oscillator may be fixed in a balanced manner, and thermal strain occurring in one fixed portion of the oscillator may be reduced more than ever.

The first to eighth arm portions may preferably be arranged at equal intervals in the circumferential direction around the central portion of the oscillator. That is, the fifth to eighth arm portions may preferably be arranged at the positions determined by rotating the first to fourth arm portions by 45° around the central portion of the oscillator. With this configuration, it may be possible to propagate the impact due to the oscillation of the oscillator, specifically the first to eighth arm portions and central portion, and impact due to rotation of the first to fourth arm portions to the four fixed portions, namely the distal end portions of the fifth to eighth arm portions, are distributed substantially equally among the four arm portions, the fifth to eighth arm portions. As a result, the oscillator may be fixed in a more balanced manner, and thermal strain in some fixed portions, or some of the distal end portions of the fifth to eighth arm portions of the oscillator may be prevented from occurring.

In the biaxial angular velocity sensor according to the present invention, weight portions may be integrally formed with the distal end portions of the first to fourth arm portions. Existence of such weight portions may make it easier for the first to fourth arm portions to be rotated and may reduce the lengths of the first to fourth arm portions of the oscillator, thereby downsizing the biaxial angular velocity sensor. The weight portions may preferably each include two protruding portions protruding in a direction from the respective distal end portions of the first to fourth arm portions toward the central portion of the oscillator. That is, the shape defined by each distal end portion of the first to fourth arm portions and each weight portion thereof including the protruding portions may preferably be formed into an B-letter shape. By forming the weight portions into an E-letter shape, it may be possible to increase the weight of the weight portions as much as possible without inhibiting the rotational motion of the first to fourth arm portions but by utilizing a space allowing the rotational motion.

In the above biaxial angular velocity sensor, the drive electrode is disposed each on the eight arm portions, the first to eighth arm portions. However, it goes without saying that the drive electrode may be disposed only on four arm portions, the first to fourth arm portions, on which the detection electrode is provided. The oscillation range of the oscillator in the Z-axis direction becomes smaller when the drive electrode is disposed only on each of the first to fourth arm portions than when the drive electrode is disposed each on the first to eighth arm portions. However, the oscillator is fixed at the four fixed portions, namely the distal end portions of the fifth to eighth arm portions, positioned away from the central portion of the oscillator through the fifth to eighth arm portions. In this case, the central portion of the oscillator is not fixed or does not serve as a fixed portion. Therefore, it may be possible to increase the oscillation range of the oscillator in the Z-axis direction as compared to the conventional configuration in which the central portion of the oscillator is fixed.

As the oscillator used in the biaxial angular velocity sensor according to the present invention, an oscillator made of a piezoelectric material may be used in place of the oscillator made of a non-piezoelectric material. A piezoelectric material such as Lead Zirconate Titanate (PZT) may be used to form the oscillator. A biaxial angular velocity sensor of a second type that uses the oscillator made of the piezoelectric material is configured as follows. A plurality of electromechanical energy converting elements for driving are not used, but a plurality of drive electrodes are directly disposed on the first to eighth arm portions or the first to fourth arm portions such that a voltage is applied when the oscillator is excited so as to displace the central portion of the oscillator in the Z-axis direction orthogonal to the X and Y axes. The drive electrodes thus configured are disposed on a front surface and a rear surface opposite to the front surface of each of the first to eighth arm portions or the first to fourth arm portions. That is, one arm portion is sandwiched by the drive electrode formed of two electrode layers, namely front and rear electrode layers, in the Z-axis direction. When a voltage is applied to the thus configured drive electrode, the arm portions of the oscillator made of a piezoelectric material each sandwiched between the two drive electrodes are excited in the Z-axis direction. Accordingly, the first to eighth arm portions or the first to fourth arm portions are oscillated in the Z-axis direction, with the result that the entire oscillator is oscillated.

Further, when the oscillator made a piezoelectric material is used, the plurality detection electrodes are disposed on the first to fourth arm portions so as to detect voltages corresponding to displacements of the first to fourth arm portions due to respective angular velocities of the first to fourth arm portions around the X and Y axes while the oscillator is being excited. The detection electrodes thus configured may have the same configuration as the drive electrode employed when the oscillator made of a piezoelectric material is used. That is, one arm portion is sandwiched between two electrode layers in the Z-axis direction. The detection electrodes detect voltages corresponding to displacements due to respective angular velocities of the first to fourth arm portions of the oscillator made of a piezoelectric material around the X and/or Y axes while the oscillator is being excited in the Z-axis direction. Even if the oscillator made of a piezoelectric material is used, it may be possible to obtain the same effect as when the oscillator made of a non-piezoelectric material is used.

BEST MODE FOR CARRYING OUT THE INVENTION

Figure 1:
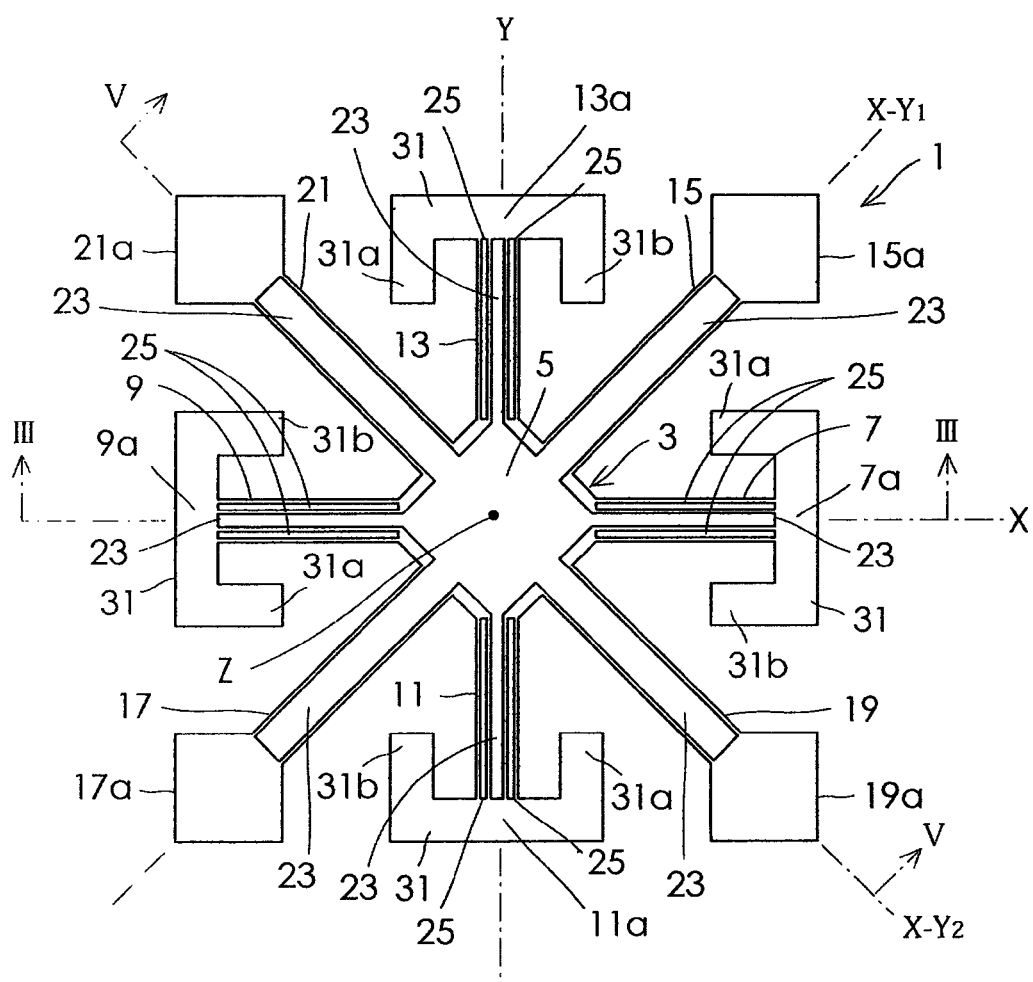
FIG. 1 is a plan view of a biaxial angular velocity sensor according to an embodiment of the present invention.
Figure 2:
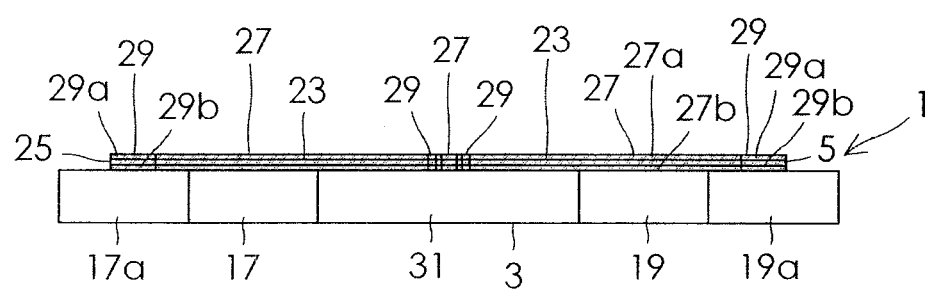
FIG. 2 is a front view of FIG. 1 as viewed from the front in a Y-axis direction.
Figure 3:
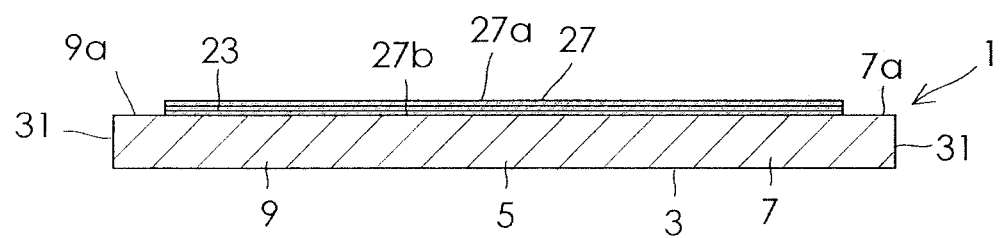
FIG. 3 is a cross-sectional view of FIG. 1 as taken along line III-III.
Figure 4:
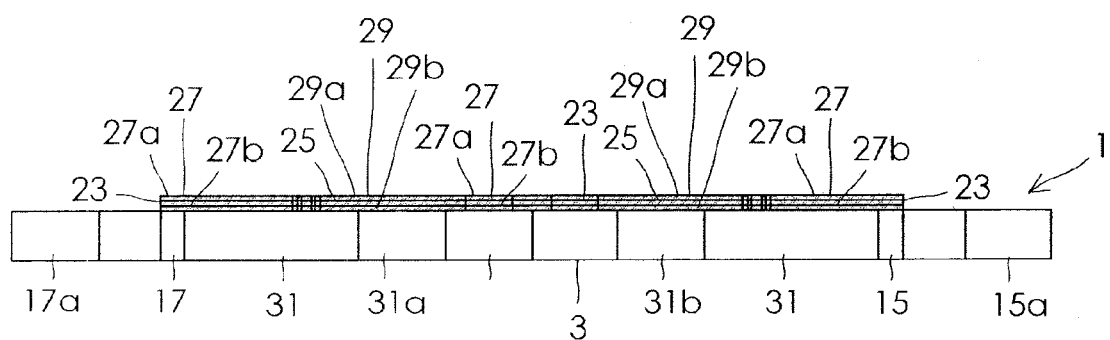
FIG. 4 is a view of FIG. 1 as viewed from the right front in an X-Y2 axis direction.
Figure 5:
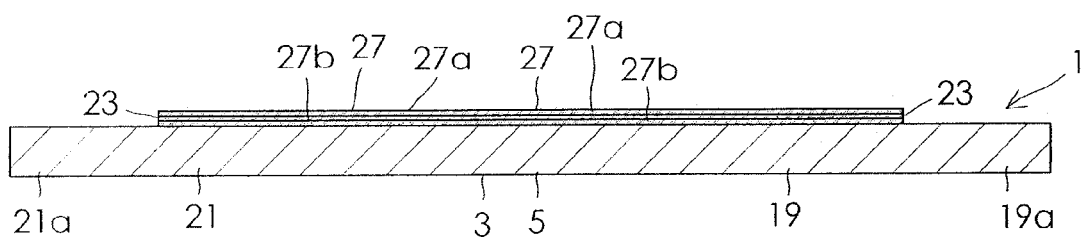
FIG. 5 is a cross-sectional view of FIG. 1 as taken along line V-V.

An embodiment of a biaxial angular velocity sensor according to the present invention will be described in detail. FIG. 1 is a plan view of the biaxial angular velocity sensor according to an embodiment of the present invention. FIG. 2 is a front view of FIG. 1 as viewed from the front in a Y-axis direction. FIG. 3 is a cross-sectional view of FIG. 1 as taken along line III-III. FIG. 4 is a view of FIG. 1 as viewed from the right front in an X-Y2-axis direction. FIG. 5 is a cross-sectional view of FIG. 1 as taken along line V-V. In the above figures, reference numeral 1 denotes a biaxial angular velocity sensor according to the present embodiment. The biaxial angular velocity sensor 1 includes an oscillator 3 made of a non-piezoelectric material and elements as described later. In this embodiment, silicon is used as a non-piezoelectric material constituting the oscillator 3.

The oscillator 3 includes a central portion 5 positioned at the center of the oscillator 3 and eight arm portions, the first to eighth arm portions 7, 9, 11, 13, 15, 17, 19, 21. The first and second arm portions 7, 9 extend from the central portion 5 of the oscillator 3 along a virtual X axis illustrated in FIG. 1 in mutually opposite directions. The third and fourth arm portions 11, 13 extend from the central portion 5 along a virtual Y-axis orthogonal to the X axis in mutually opposite directions. The fifth and sixth arm portions 15, 17 extend from the central portion 5 in mutually opposite directions along a virtual X-Y1 axis or a first X-Y axis extending between the X and Y axes and have distal end portions 15a, 17a fixedly supported. The seventh and eighth arm portions 19, 21 extend from the central portion 5 in mutually opposite directions along a virtual X-Y2 axis or a second X-Y axis orthogonal to the X-Y1 axis and have distal end portions 19a, 21a fixedly supported. Support structures, not illustrated, to which the distal end portions 15a to 21a are fixed are configured so as to allow the first to eighth arm portions 7 to 21 to be oscillated in a Z-axis direction and the first to fourth arm portions 7 to 13 to be rotated around the X axis and/or Y axis with the distal end portions 15a to 21a being fixedly supported.

A plurality of electromechanical energy converting elements 23 for driving and a plurality of electromechanical energy converting elements 25 for detection are disposed on the oscillator 3. The electromechanical energy converting elements 23 for driving are disposed each on the first to eighth arm portions 7 to 21 of the oscillator 3. The electromechanical energy converting elements for detection 25 are disposed each on the first to fourth arm portions 7, 9, 11, 13 of the oscillator 3. The electromechanical energy converting elements 23 for driving have a function of converting electricity into driving energy through the first to eighth arm portions 7 to 21 of the oscillator 3 so as to oscillate the oscillator 3. The electromechanical energy converting elements 25 for detection have a function of converting into electricity the energy of rotational motion or angular velocity generated as the Coriolis force when the oscillator 3 is moved while being oscillated.

In the present embodiment, a plurality of drive electrodes 27 are disposed corresponding to the electromechanical energy converting elements 23 for driving, disposed on the first to eighth arm portions 7 to 21. The drive electrodes 27 are each configured such that a voltage is applied when the oscillator 3 is excited so as to displace the central portion 5 of the oscillator 3 in a direction of a virtual Z-axis orthogonal to the X and Y axes. When the oscillator 3 made of a non-piezoelectric material such as silicon is used as in the present embodiment, a layered structure is formed by sandwiching the electromechanical energy converting element 23 for driving, which is a piezoelectric thin-film layer, between two electrode layers 27a, 27b of the drive electrode 27 and the layered structure thus formed is disposed on the surface of each of the first to eighth arm portions 7 to 21. In the present embodiment, as illustrated in FIG. 1, the layered structure formed by the electromechanical energy converting element 23 for driving and drive electrode 27 is formed with a region for disposing a detection electrode 29, which will be described later, on each of the first to fourth arm portions 7, 9, 11, 13. The electrode layers 27a, 27b are formed in such a manner that a thin film of gold (Au) is first formed by sputtering or evaporation and then the thin film is etched to form an electrode pattern.

The electromechanical energy converting element 23 for driving, which is a piezoelectric thin-film layer, is formed using Lead Zirconate Titanate (PZT) according to a known thin-film forming technique.

In the present embodiment, as illustrated in FIG. 1, the drive electrode 27 is not formed on the distal end portions 15a, 17a, 19a, 21a of the fifth to eighth arm portions 15, 17, 19, 21. Further, as illustrated in FIG. 1, the plurality of drive electrodes 27 disposed on the first to eighth arm portions 7 to 21 are integrally formed with a layered structure which is formed in the central portion 5 and has the same structure as the drive electrode 27. When a voltage is applied to the drive electrodes 27 thus configured, the electromechanical energy converting elements 23 for driving, which are piezoelectric thin-film layers and each sandwiched between the two electrode layers 27a, 27b of each drive electrode 27, are excited in the Z-axis direction. Accordingly, the first to eighth arm portions 7 to 21 are oscillated in the Z-axis direction, with the result that the entire oscillator 3 including the central portion 5 is oscillated.

Further, in the present embodiment, a plurality of detection electrodes 29 are disposed corresponding to the electromechanical energy converting elements 25 for detection, disposed on the first to fourth arm portions 7, 9, 11, 13. When the oscillator 3 made of a non-piezoelectric material such as silicon is used as in the present embodiment, similar to the electromechanical energy converting elements 23 for driving and drive electrodes 27, the) electromechanical energy converting elements 5 for detection, which are piezoelectric thin-film layers, and detection electrode 29 are configured such that a layered structure formed by sandwiching the electromechanical energy converting element 25 for detection, which is a piezoelectric thin-film layer, between two electrode layers 29a, 29b of the detection electrode 29 is disposed on the surface of each of the first to fourth arm portions 7, 9, 11, 13 according to a thin-film formation technique. The layered structure comprised of the electromechanical energy converting element 25 for detection, which is a piezoelectric thin-film layer, and detection electrode 29 is formed in a region on each of the first to fourth arm portions 7, 9, 11, 13 at which the drive electrode 27 is not formed, as illustrated in FIG. 1. The electrode layers 29a, 29b are formed in the same manner as the electrode layers 27a, 27b.

Further, the electromechanical energy converting element 25 for detection, which is a piezoelectric thin-film layer, is formed in the same manner as the electromechanical energy converting element 23 for driving which is a piezoelectric thin-film layer. The detection electrodes 29 thus configured output voltages corresponding to displacements of the first to fourth arm portions 7, 9, 11, 13 due to respective angular velocities of the first to fourth arm portions 7, 9, 11, 13 around the X and/or Y axes while the oscillator 3 is being excited.

In the present embodiment, weight portions 31 are integrally formed with the distal end portions 7a, 9a, 11a, 13a disposed at the positions on the opposite side to the central portion 5 of the first to fourth arm portions 7, 9, 11, 13. The weight portions 31 each include two protruding portions 31a, 31b protruding in the direction from the respective distal end portions 7a, 9a, 11a, 13a of the first to fourth arm portions 7, 9, 11, 13 toward the central portion 5 of the oscillator 3. More specifically, the shape defined by each distal end portion 7a, 9a, 11a, 13a of the first to fourth arm portions 7, 9, 11, 13 and each weight portion 31 thereof including the two protruding portions 31a, 31b is formed into an E-letter shape. In the present embodiment, as illustrated in FIG. 1, the drive electrode 27 and detection electrode 29 are not formed on the distal end portions 7a, 9a, 11a, 13a of the first to fourth arm portions 7, 9, 11, 13 and four weight portions 31 thereof. In the present embodiment, etching is applied to the oscillator 3 made of silicon with the drive electrodes 27 and detection electrodes 29 being formed on the oscillator 3, thereby forming the oscillator 3 and weight portions 31 integrally formed with the oscillator 3.

Figure 6:
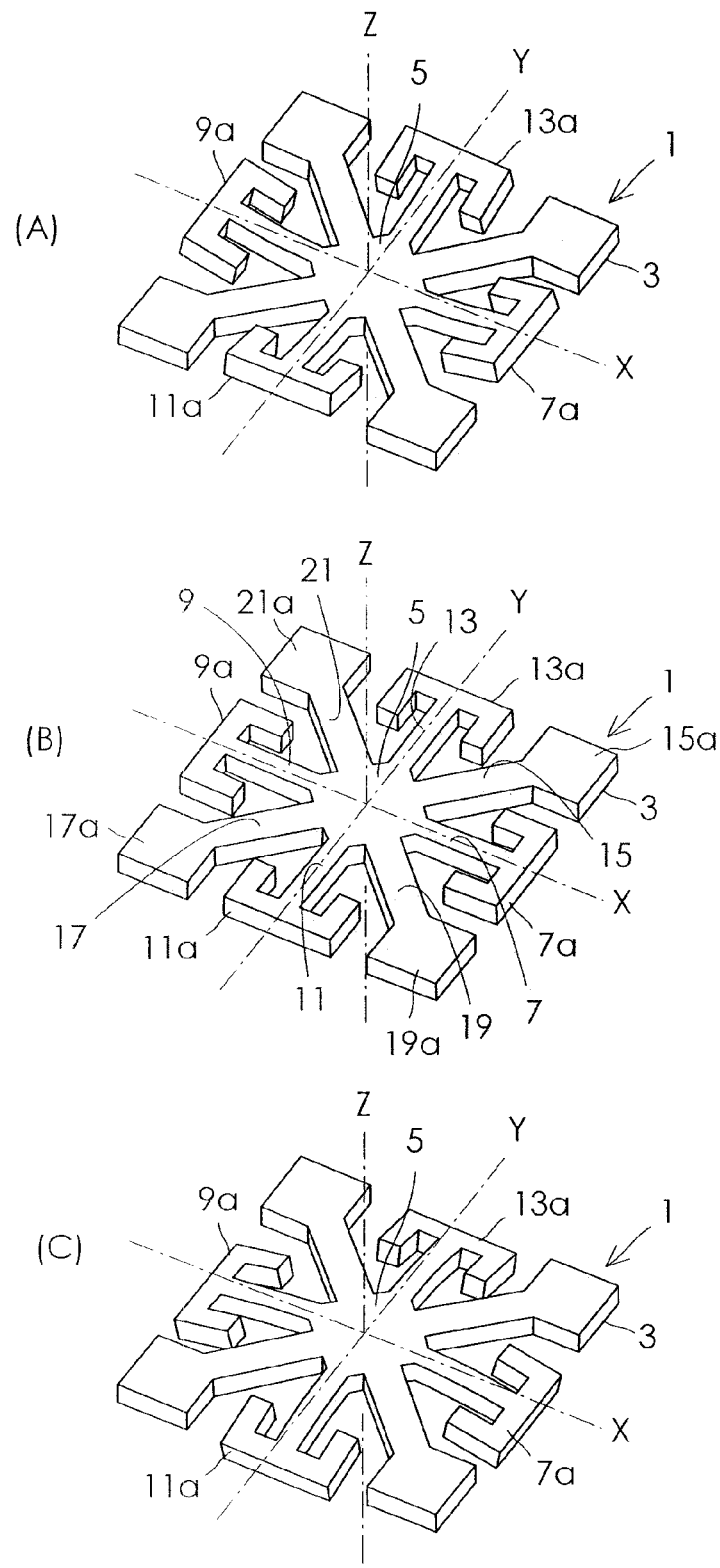
FIGS. 6(A) to 6(C) explain vibrations of the oscillator of the biaxial angular velocity sensor according to the present embodiment when oscillated in the Z-axis direction.

FIGS. 6(A) to 6(C) explain vibrations of the oscillator of the biaxial angular velocity sensor according to the present embodiment when oscillated in the Z-axis direction. A sensor mechanism of the biaxial angular velocity sensor 1 will be described with reference to FIGS. 6(A) to 6(C). For ease of understanding, illustrations of the drive electrodes 27 and detection electrodes 29 are omitted. When a voltage is applied to the plurality of drive electrodes 27 disposed on the first to eighth arm portions 7 to 21 in the state of FIG. 6(B), the oscillator 3 is oscillated in the Z-axis direction as illustrated in FIGS. 6(A) and 6(C). More specifically, when the central portion 5 of the oscillator 3 is moved in the negative or downward direction of the Z axis as illustrated in FIG. 6(A), the distal end portions 7a, 9a, 11a, 13a of the first to fourth arm portions 7, 9, 11, 13 are moved in the positive or upward direction the Z axis. Further, when the central portion 5 of the oscillator 3 is moved in the positive or upward direction of the Z axis as illustrated in FIG. 6(C), the distal end portions 7a, 9a, 11a, 13a of the first to fourth arm portions 7, 9, 11, 13 are moved in the negative or downward direction of the Z axis. When the oscillator 3 is moved or acceleration is generated in the X-axis direction and/or Y-axis direction while being oscillated in the Z-axis direction, the Coriolis force is generated around the X axis and/or Y axis. By the Coriolis force, the first and second arm portions 7, 9 and/or third and fourth arm portions 11, 13 are rotated or angular velocity is generated around the X axis and/or Y axis. The detection electrodes 29 disposed on the first to fourth arm portions 7, 9, 11, 13 output displacements or voltages corresponding to the displacements of the rotational motion due to the angular velocities. Then, by converting the detected displacements or voltages corresponding to the displacements of the first to fourth arm portions 7, 9, 11, 13 into the accelerations of the oscillator 3 in the X-axis direction and/or Y-axis direction, the accelerations of the oscillator 3 may be measured in the X-axis direction and/or Y-axis direction.

In the biaxial angular velocity sensor 1 of the present embodiment, not only the first to fourth arm portions 7, 9, 11, 13 of the oscillator 3 but also the fifth to eighth arm portions 15, 17, 19, 21 are oscillated in the Z-axis direction, and the central portion 5 of the oscillator 3 is not fixed. Accordingly, the entire oscillator 3 including the central portion may be oscillated in the Z-axis direction with a large oscillation range. As a result, even if the accelerations of the oscillator in X-axis direction and/or Y-axis direction are small, high angular velocity may be obtained, thereby enhancing the sensor detection sensitivity. Further, the distal end portions 15a, 17a, 19a, 21a of the fifth to eighth arm portions 15, 17, 19, 21 of the present invention are fixedly supported at the positions on the opposite side to the central portion 5 of the oscillator 3. The oscillator 3 may be supported at the four fixed portions, namely the distal end portions 15a, 17a, 19a, 21a of the fifth to eighth arm portions, through the central portion 5 and four arm portions, namely the fifth to eighth arm portions 15, 17, 19, 21. Therefore, even if the oscillation range of the oscillator 3, specifically the first to eighth arm portions 7 to 21 and central portion 5, in the Z-axis direction becomes large and even if the rotational motions or angular velocity of the oscillator 3, specifically the distal end portions 7a, 9a, 11a, 13a of the first to fourth arm portions, around the X axis and/or Y axis become large, the oscillator 3 may be maintained in a stable fixed state. Further, in the biaxial angular velocity sensor of the present embodiment, the distance from each of the first to fourth arm portions 7, 9, 11, 13 to each of the four fixed portions, namely the distal end portions 15a, 17a, 19a, 21a of the fifth to eighth arm portions, is larger than the distance from the distal end of the arm portion of the oscillator to the central portion fixed portion in a conventional biaxial angular velocity sensor in which the central portion of the oscillator is fixed. Thus, impact due to the oscillation of the oscillator 3, specifically the first to fourth arm portions 7, 9, 11, 13, in the Z-axis direction and impact due to rotational motions or angular velocities around the X axis and/or Y axis are difficult to be propagated to the central portion 5 of the oscillator 3. In addition, the above-mentioned impacts may be propagated to the four fixed portions, namely the distal end portions 15a, 17a, 19a, 21a of the fifth to eighth arm portions, in a distributed manner through the four arm portions, the fifth to eighth arm portions 15, 17, 19, 21. As a result, the oscillator 3 may be fixed in a balanced manner, thermal strain occurring in one fixed portion of the oscillator 3 may be reduced. Further, in the present embodiment, existence of the weight portions 31 may make it easier for the first to fourth arm portions 7, 9, 11, 13 of the oscillator 3 to be rotated and may reduce the respective lengths of the first to fourth arm portions of the oscillator 3, thereby downsizing the biaxial angular velocity sensor. Further, by forming the weight portions 31 into an E-letter shape, it may be possible to increase the weight of the weight portions 31 as much as possible without inhibiting the rotational motion of the first to fourth arm portions 7, 9, 11, 13 but by utilizing a space allowing the rotational motion.

Further, in the present embodiment, as illustrated in FIG. 1, the first to eighth arm portions 7 to 21 are arranged at equidistant intervals around the central portion 5 of the oscillator 3. More specifically, the fifth to eighth arm portions 15, 17, 19, 21 are arranged at the positions determined by rotating the first to fourth arm portions 7, 9, 11, 13 by 45° around the central portion 5 of the oscillator 3. With this configuration, it may be possible to propagate the impact due to the oscillation of the oscillator 3, specifically the first to eighth arm portions 15, 17, 19, 21 and central portion 5, and impact due to rotations of the first to fourth arm portions 7, 9, 11, 13 to the four fixed portions, namely the distal end portions 15a, 17a, 19a, 21a of the fifth to eighth arm portions, in an equally distributed manner through the four arm portions, the fifth to eighth arm portions 15, 17, 19, 21. As a result, the oscillator 3 may be fixed in a more balanced manner, and thermal strain in some fixed portions or some of the distal end portions of the fifth to eighth arm portions 15a, 17a, 19a, 21a of the oscillator 3 may be prevented from occurring.

In the above biaxial angular velocity sensor illustrated in FIGS. 1 to 5, the drive electrode 27 need not always be disposed on all the eight arm portions, the first to eighth arm portions 7 to 21, but may be disposed only on four arm portions, the first to fourth arm portions, on which the detection electrode 29 is formed. Although not illustrated, when the drive electrode 27 is disposed only on the first to fourth arm portions 7, 9, 11, 13, the oscillation range of the oscillator 3 in the Z-axis direction becomes smaller than when the electromechanical energy converting element 23 for driving and drive electrode 27 are disposed on all the first to eighth arm portions 7 to 21 by the amount corresponding to the number of the arm portions, the fifth to eight arm portions 15, 17, 19, 21, on which the electromechanical energy converting element 23 for driving is not formed. However, the oscillator 3 is fixed at the four fixed portions, namely the distal end portions 15a, 17a, 19a, 21a of the fifth to eighth arm portions, positioned away from the central portion 5 of the oscillator 3. That is, the central portion 5 of the oscillator 3 is not fixed. Accordingly, it may be possible to increase the oscillation range of the oscillator 3 in the Z-axis direction as compared to the conventional biaxial angular velocity sensor in which the central portion 5 of the oscillator 3 is fixed.

Figure 7:
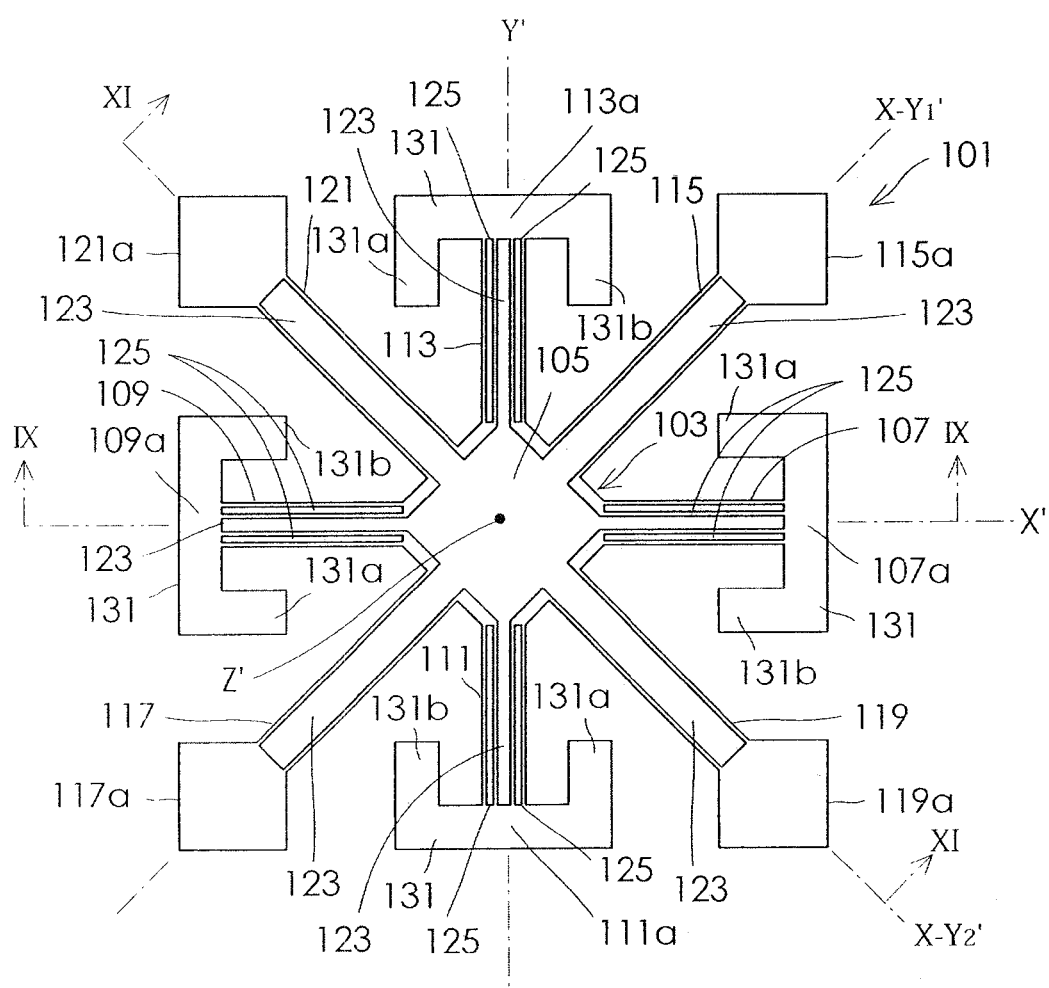
FIG. 7 is a plan view of the biaxial angular velocity sensor according to another embodiment of the present invention.
Figure 8:
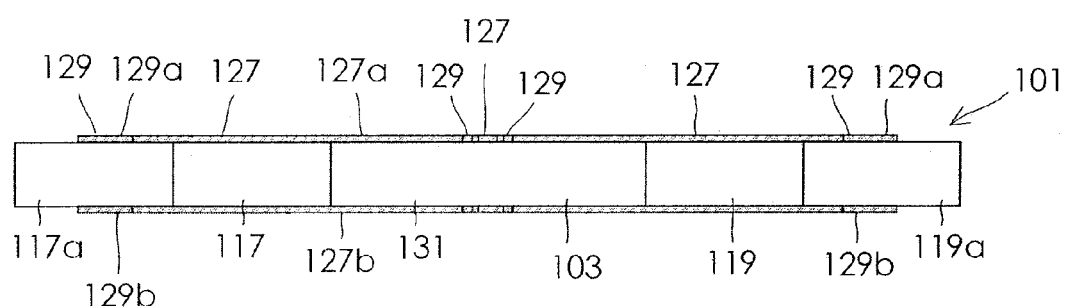
FIG. 8 is a front view of FIG. 7 as viewed from the front in a Y'-axis direction.
Figure 9:
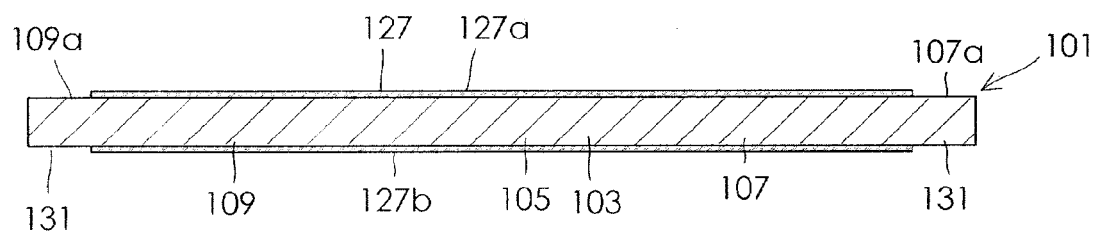
FIG. 9 is a cross-sectional view of FIG. 7 as taken along line IX-IX.
Figure 10:
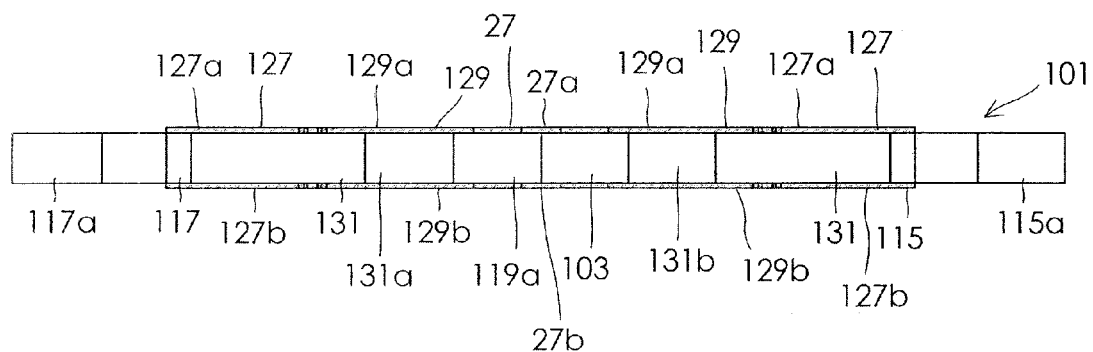
FIG. 10 is a view of FIG. 7 as viewed from the right front in an X-Y2' axis direction.
Figure 11:
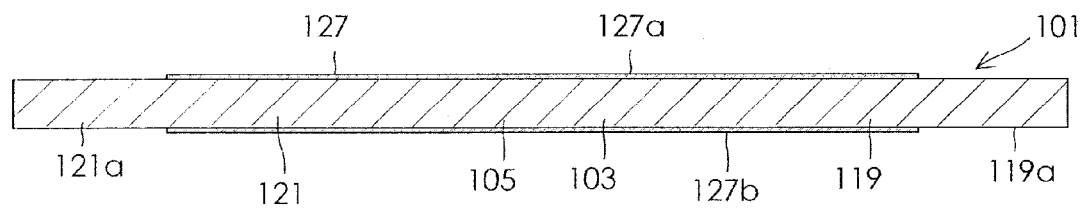
FIG. 11 is a cross-sectional view of FIG. 7 as taken along line XI-XI.

Next, a biaxial angular velocity sensor according to another embodiment of the present invention will be described. FIG. 7 is a plan view of the biaxial angular velocity sensor as the second embodiment of the present invention. FIG. 8 is a front view of FIG. 7 as viewed from the front in a Y'-axis direction. FIG. 9 is a cross-sectional view of FIG. 7 as taken along line IX-IX. FIG. 10 is a view of FIG. 7 as viewed from the right front in an X-Y2'-axis direction. FIG. 11 is a cross-sectional view of FIG. 7 as taken along Line XI-XI. In FIGS. 7 to 10, reference numerals obtained by adding 100 to the reference numerals are assigned to the components illustrated in FIGS. 7 to 10 which are common to the first embodiment illustrated in FIGS. 1 to 5, and the overlapped description is omitted. In the embodiment illustrated in FIGS. 7 to 11, an oscillator 103 made of a piezoelectric material is adopted as an oscillator of the biaxial angular velocity sensor. In this embodiment, the piezoelectric bulk made of Lead Zirconate Titanate (PZT) is used as the oscillator 103. When the oscillator 103 made of a piezoelectric material (PZT) is used as in the present embodiment, the plurality of electromechanical energy converting elements 23, 25, which are piezoelectric thin-film layers, are not used. In this case, a plurality of drive electrodes 127 are directly disposed on first to eighth arm portions 107, 109, 111, 113, 115, 117, 119, 121 such that a voltage is applied when the oscillator 103 is excited so as to displace a central portion 105 of the oscillator 103 in the direction of the Z'-axis orthogonal to the X' and Y' axes. More specifically, electrode layers 127a, 127b which form a drive electrode 127 are disposed on the front surface and rear surface opposite to the front surface of each of the first to eighth arm portions 107 to 121. That is, one arm portion is sandwiched between the two electrode layers 127a, 127b forming the drive electrode 127 in the Z'-axis direction. When a voltage is applied to the drive electrode 127 thus configured, the arm portions 107 to 121 of the oscillator 103 made of a piezoelectric material (PZT) each sandwiched between the two electrode layers 127a, 127b are excited in the Z'-axis direction. Accordingly, the first to eighth arm portions 107 to 121 are oscillated in the Z'-axis direction, with the result that the entire oscillator 103 including the central portion 105 is oscillated.

Further, in the present embodiment using the oscillator 103 made of a piezoelectric material, a plurality of detection electrodes 129 are disposed on the first to eighth arm portions 107 to 121 so as to detect voltages corresponding to displacements of the first to eighth arm portions 107 to 121 due to respective angular velocities of the first to eighth arm portions 107 to 121 around the X' and Y' axes while the oscillator 103 is being excited. The detection electrodes 129 thus configured have the same configuration as the drive electrodes 127 employed in the oscillator 103 made of a piezoelectric material (PZT) whereby one arm portion is sandwiched between two electrodes 127a, 127b in the Z'-axis direction. The detection electrodes 129 detect voltages corresponding to displacements due to respective angular velocities of the first to fourth arm portions 107, 109, 111, 113 of the oscillator 103 made of a piezoelectric material (PZT) around the X' and/or Y' axes while the oscillator 103 is being excited in the Z'-axis direction. Thus, even if the oscillator 103 made of a piezoelectric material (PZT) is used, it may be possible to obtain the same effect, specifically effects of enhancing the sensor detection sensitivity, stably fixing the oscillator, reducing thermal strain occurring in the fixed portion, etc., as when the oscillator 3 made of a non-piezoelectric material is used.

Also in the second embodiment, as in the first embodiment illustrated in FIGS. 1 to 5, the drive electrodes 127 need not always be disposed on the eight arm portions, the first to eighth arm portions 107 to 121, but may be disposed only on four arm portions, the first to fourth arm portions 107, 109, 111, 113, on which the detection electrode 129 is formed.

The Z-axis direction oscillation range was measured in the biaxial angular velocity sensor 1 of the embodiments of the present invention. Example 1 corresponding to the first embodiment as illustrated in FIGS. 1 to 5 was configured to include the drive electrode 27 disposed on all the eight arm portions, the first to eight arm portions 7 to 21. Example 2, not illustrated, was configured to include the drive electrode 27 disposed on only the four arm portions, the first to fourth arm portions 7, 9, 11 13, on which the detection electrode 29 is formed. Example 3 corresponding to the second embodiment as illustrated in FIGS. 7 to 11 was configured in the same way as Example 1 except that the oscillator 103 made of a piezoelectric material was used in place of the oscillator 3 made of a non-piezoelectric material. Example 4, not illustrated, was configured in the same way as Example 2 except that the oscillator made of a piezoelectric material was used in place of the oscillator made of a non-piezoelectric material. Comparative Example 1 was configured to include the drive electrode 27 disposed only on the four arm portions, the fifth to eighth arm portions 15, 17, 19, 21 positioned near the fixed portion, on which the detection electrode 29 is not formed. Comparative Example 2 was configured in the same way as Comparative Example 1 except that the oscillator made of a piezoelectric material was used in place of the oscillator made of a non-piezoelectric material. The components other than those mentioned above were common to Examples 1 to 4 and Comparative Examples 1 and 2.

When a voltage was applied to the drive electrode, the oscillation range of the oscillator in the Z-axis direction was as follows: 15.9 nm in Example 1; 10.7 nm in Example 2; 15.8 nm in Example 3; 11.7 nm in Example 4; 5.37 nm in Comparative Example 1; and 4.49 nm in Comparative Example 2. Examples 1 and 3 exhibited an oscillation range about three times larger than those of Comparative examples 1 and 2. Examples 2 and 4 exhibited a smaller oscillation range than Examples 1 and 3 but about two times larger than those of Comparative Examples 1 and 2. As described above, in each of Examples 1 to 4, the central portion of the oscillator is not fixed, and accordingly the entire oscillator including the central portion may be oscillated in the Z-axis direction with a large oscillation range. As a result, even if the movements or accelerations of the oscillator in X-axis direction and/or Y-axis direction are small, high angular velocity may be obtained, thereby enhancing the sensor detection sensitivity. In Examples 1 and 3, not only the first to fourth arm portions of the oscillator 3 but also the fifth to eighth arm portions are oscillated in the Z-axis direction. Accordingly, higher angular velocity may be obtained, thereby further enhancing the sensor detection sensitivity.

The configuration of the present invention may be described as follows.

(1) A biaxial angular velocity sensor comprising: an oscillator made of a non-piezoelectric material and including: a central portion; a first arm portion extending from the central portion along an X axis passing through the center of the central portion; a second arm portion extending from the central portion along the X axis in an opposite direction to the first arm portion; a third arm portion extending from the central portion along a Y axis passing through the center of the central portion and orthogonal to the X axis; a fourth arm portion extending from the central portion along the Y axis in an opposite direction to the third arm portion; a fifth arm portion extending from the central portion along a first X-Y axis passing through the center of the central portion between the X and Y axes, the fifth arm portion having a distal end portion fixedly supported; a sixth arm portion extending from the central portion along the first X-Y axis in an opposite direction to the fifth arm portion, the sixth arm portion having a distal end portion fixedly supported; a seventh arm portion extending from the central portion along a second X-Y axis passing through the center of the central portion between the X and Y axes and orthogonal to the first X-Y axis, the seventh arm portion having a distal end portion fixedly supported; and an eighth arm portion extending from the central portion along the second X-Y axis in an opposite direction to the seventh arm portion, the eighth arm portion having a distal end portion fixedly supported; a plurality of electromechanical energy converting elements for driving, disposed on the first to eighth arm portions of the oscillator; a plurality of electromechanical energy converting elements for detection, disposed on the first to fourth arm portions of the oscillator; plurality of drive electrodes disposed corresponding to the electromechanical energy converting elements for driving disposed on the first to eighth arm portions, the drive electrodes being each configured to be applied a voltage when the oscillator is excited to be displaced in a direction of a Z axis passing through the center of the central portion and orthogonal to the X and Y axes; and a plurality of detection electrodes disposed corresponding to the electromechanical energy converting elements for detection disposed on the first to fourth arm portions, the detection electrodes being each configured to detect voltages corresponding to displacements of the first to fourth arm portions due to respective angular velocities of the first to fourth arm portions around the X and Y axes while the oscillator is being excited.

(2) A biaxial angular velocity sensor comprising: an oscillator made of a piezoelectric material and including: a central portion; a first arm portion extending from the central portion along an X axis passing through the center of the central portion; a second arm portion extending from the central portion along the X axis in an opposite direction to the first arm portion; a third arm portion extending from the central portion along a Y axis passing through the center of the central portion and orthogonal to the X axis; a fourth arm portion extending from the central portion along the Y axis in an opposite direction to the third arm portion; a fifth arm portion extending from the central portion along a first X-Y axis passing through the center of the central portion between the X and Y axes, the fifth arm portion having a distal end portion fixedly supported; a sixth arm portion extending from the central portion along the first X-Y axis in an opposite direction to the fifth arm portion, the sixth arm portion having a distal end portion fixedly supported; a seventh arm portion extending from the central portion along a second X-Y axis passing through the center of the central portion between the X and Y axes and orthogonal to the first X-Y axis, the seventh arm portion having a distal end portion fixedly supported; and an eighth arm portion extending from the central portion along the second X-Y axis in an opposite direction to the seventh arm portion, the eighth arm portion having a distal end portion fixedly supported; a plurality of drive electrodes disposed corresponding to the first eighth arm portions, the drive electrodes being each configured to be applied a voltage when the oscillator is excited to be displaced in a direction of a Z axis passing through the center of the central portion and orthogonal to the X and Y axes; and a plurality of detection electrodes disposed on the first to fourth arm portions, and each configured to detect voltages corresponding to displacements of the first to fourth arm portions due to respective angular velocities of the first to fourth arm portions around the X and Y axes while the oscillator is being excited.

(3) A biaxial angular velocity sensor comprising: an oscillator made of a non-piezoelectric material and including: a central portion; a first arm portion extending from the central portion along an X axis passing through the center of the central portion; a second arm portion extending from the central portion along the X axis in an opposite direction to the first arm portion; a third arm portion extending from the central portion along a Y axis passing through the center of the central portion and orthogonal to the X axis; a fourth arm portion extending from the central portion along the Y axis in an opposite direction to the third arm portion; a fifth arm portion extending from the central portion along a first X-Y axis passing through the center of the central portion between the X and Y axes, the fifth arm portion having a distal end portion fixedly supported; a sixth arm portion extending from the central portion along the first X-Y axis in an opposite direction to the fifth arm portion, the sixth arm portion having a distal end portion fixedly supported; a seventh arm portion extending from the central portion along a second X-Y axis passing through the center of the central portion between the X and Y axes and orthogonal to the first X-Y axis, the seventh arm portion having a distal end portion fixedly supported; and an eighth arm portion extending from the central portion along the second X-Y axis in an opposite direction to the seventh arm portion, the eighth arm portion having a distal end portion fixedly supported; a plurality of electromechanical energy converting elements for driving, disposed on the first to fourth arm portions of the oscillator; a plurality of electromechanical energy converting elements for detection, disposed on the first to fourth arm portions of the oscillator; a plurality of drive electrodes disposed corresponding to the electromechanical energy converting elements for driving disposed on the first to fourth arm portions, the drive electrodes being each configured to be applied a voltage when the oscillator is excited to be displaced in a direction of a Z axis passing through the center of the central portion and orthogonal to the X and Y axes; and a plurality of detection electrodes disposed corresponding to the electromechanical energy converting elements for detection disposed on the first to fourth arm portions, the detection electrodes being each configured to detect voltages corresponding to displacements of the first to fourth arm portions due to respective angular velocities of the first to fourth arm portions around the X and Y axes while the oscillator is being excited.

(4) A biaxial angular velocity sensor comprising: an oscillator made of a piezoelectric material and including: a central portion; a first arm portion extending from the central portion along an X axis passing through the center of the central portion; a second arm portion extending from the central portion along the X axis in an opposite direction to the first arm portion; a third arm portion extending from the central portion along a Y axis passing through the center of the central portion and orthogonal to the X axis; a fourth arm portion extending from the central portion along the Y axis in an opposite direction to the third arm portion; a fifth arm portion extending from the central portion along a first X-Y axis passing through the center of the central portion between the X and Y axes, the fifth arm portion having a distal end portion fixedly supported; a sixth arm portion extending from the central portion along the first X-Y axis in an opposite direction to the fifth arm portion, the sixth arm portion having a distal end portion fixedly supported; a seventh arm portion extending from the central portion along a second X-Y axis passing through the center of the central portion between the X and Y axes and orthogonal to the first X-Y axis, the seventh arm portion having a distal end portion fixedly supported; and an eighth arm portion extending from the central portion along the second X-Y axis in an opposite direction to the seventh arm portion, the eighth arm portion having a distal end portion fixedly supported; a plurality of drive electrodes disposed corresponding to the first to fourth arm portions, the drive electrodes being each configured to be applied a voltage when the oscillator is excited to be displaced in a direction of a Z axis passing through the center of the central portion and orthogonal to the X and Y axes; and a plurality of detection electrodes disposed on the first to fourth arm portions, and each configured to detect voltages corresponding to displacements of the first to fourth arm portions due to respective angular velocities of the first to fourth arm portions around the X and Y axes white the oscillator is being excited.

(5) The biaxial angular velocity sensor according to any of (1) to (4), wherein a weight portion is integrally formed with a distal end portion of each of the first to forth arm portions.

(6) The biaxial angular velocity sensor according to any of (1) to (4), wherein a weight portion is integrally formed with a distal end portion of each of the first to forth arm portions, and the weight portions each include two protruding portions protruding in a direction from the respective distal end portions of the first to fourth arm portions toward the central portion of the oscillator.

INDUSTRIAL APPLICABILITY

According to the present invention, the first to eighth arm portions of the oscillator are oscillated in the Z-axis direction, and the central portion of the oscillator is not fixed. Accordingly, the entire oscillator may be oscillated in the Z-axis direction with a large oscillation range. As a result, even if the accelerations of the oscillator in X-axis direction and/or Y-axis direction are small, high angular velocity may be obtained around the X axis and/or Y axis, thereby enhancing the sensor detection sensitivity.

The invention claimed is:

1. A biaxial angular velocity sensor comprising:
an oscillator made of a non-piezoelectric material and including:
  a central portion;
  a first arm portion extending from the central portion along an X axis passing through a center of the central portion;
  a second arm portion extending from the central portion along the X axis in an opposite direction to the first arm portion;
  a third arm portion extending from the central portion along a Y axis passing through the center of the central portion and orthogonal to the X axis;
  a fourth arm portion extending from the central portion along the Y axis in an opposite direction to the third arm portion;
  a fifth arm portion extending from the central portion along a first X-Y axis passing through the center of the central portion between the X and Y axes, the fifth arm portion having a distal end portion fixedly supported;
  a sixth arm portion extending from the central portion along the first X-Y axis in an opposite direction to the fifth arm portion, the sixth arm portion having a distal end portion fixedly supported;
  a seventh arm portion extending from the central portion along a second X-Y axis passing through the center of the central portion between the X and Y axes and orthogonal to the first X-Y axis, the seventh arm portion having a distal end portion fixedly supported; and
  an eighth arm portion extending from the central portion along the second X-Y axis in an opposite direction to the seventh arm portion, the eighth arm portion having a distal end portion fixedly supported;
a plurality of electromechanical energy converting elements for driving, disposed on the first to eighth arm portions of the oscillator;
a plurality of electromechanical energy converting elements for detection, disposed on the first to fourth arm portions of the oscillator;
a plurality of drive electrodes disposed corresponding to the electromechanical energy converting elements for driving, disposed on the first to eighth arm portions, the drive electrodes being each configured to be applied a voltage when the oscillator is excited to be displaced in a direction of a Z axis passing through the center of the central portion and orthogonal to the X and Y axes; and
a plurality of detection electrodes disposed corresponding to the electromechanical energy converting elements for detection disposed on the first to fourth arm portions, the detection electrodes being each configured to detect voltages corresponding to displacements of the first to fourth arm portions due to respective angular velocities of the first to fourth arm portions around the X and Y axes while the oscillator is being excited.

2. A biaxial angular velocity sensor comprising:
an oscillator made of a non-piezoelectric material and including:
  a central portion;
  a first arm portion extending from the central portion along an X axis passing through a center of the central portion;
  a second arm portion extending from the central portion along the X axis in an opposite direction to the first arm portion;
  a third arm portion extending from the central portion along a Y axis passing through the center of the central portion and orthogonal to the X axis;
  a fourth arm portion extending from the central portion along the Y axis in an opposite direction to the third arm portion;
  a fifth arm portion extending from the central portion along a first X-Y axis passing through the center of the central portion between the X and Y axes, the fifth arm portion having a distal end portion fixedly supported;
  a sixth arm portion extending from the central portion along the first X-Y axis in an opposite direction to the fifth arm portion, the sixth arm portion having a distal end portion fixedly supported;
  a seventh arm portion extending from the central portion along a second X-Y axis passing through the center of the central portion between the X and Y axes and orthogonal to the first X-Y axis, the seventh arm portion having a distal end portion fixedly supported; and
  an eighth arm portion extending from the central portion along the second X-Y axis in an opposite direction to the seventh arm portion, the eighth arm portion having a distal end portion fixedly supported;
a plurality of drive electrodes disposed at least corresponding to the first to fourth arm portions, the drive electrodes being each configured to be applied a voltage when the oscillator is excited to be displaced in a direction of a Z axis passing through the center of the central portion and orthogonal to the X and Y axes; and a plurality of detection electrodes disposed on the first to fourth arm portions, and each configured to detect voltages corresponding to displacements of the first to fourth arm portions due to respective angular velocities of the first to fourth arm portions around the X and Y axes while the oscillator is being excited.

3. The biaxial angular velocity sensor according to claim 2, wherein:
the oscillator is made of a non-piezoelectric material and further includes:
a plurality of electromechanical energy converting elements for driving, disposed on at least the first to fourth arm portions; and
a plurality of electromechanical energy converting elements for detection, disposed on the first to fourth arm portions; and
the drive electrodes are disposed corresponding to the electromechanical energy converting elements for driving disposed on the first to fourth arm portions.

4. The biaxial angular velocity sensor according to claim 3, wherein:
the electromechanical energy converting elements for driving are also disposed on the fifth to eighth arm portions; and
the drive electrodes are also disposed corresponding to the electromechanical energy converting elements for driving, disposed on the fifth to eighth arm portions.

5. The biaxial angular velocity sensor according to claim 2, wherein the oscillator is made of a piezoelectric material.

6. The biaxial angular velocity sensor according to claim 5, wherein the drive electrodes are also disposed corresponding to the fifth to eighth arm portions.

7. The biaxial angular velocity sensor according to claim 1, wherein a weight portion is integrally formed with a distal end portion of each of the first to fourth arm portions.

8. The biaxial angular velocity sensor according to claim 1, wherein:
a weight portion is integrally formed with a distal end portion of each of the first to fourth arm portions; and
the weight portions each include two protruding portions protruding in a direction from the respective distal end portions of the first to fourth arm portions toward the central portion of the oscillator.

9. The biaxial angular velocity sensor according to claim 2, wherein a weight portion is integrally formed with a distal end portion of each of the first to fourth arm portions.

10. The biaxial angular velocity sensor according to claim 2, wherein:
a weight portion is integrally formed with a distal end portion of each of the first to fourth arm portions; and
the weight portions each include two protruding portions protruding in a direction from the respective distal end portions of the first to fourth arm portions toward the central portion of the oscillator.

11. The biaxial angular velocity sensor according to claim 3, wherein a weight portion is integrally formed with a distal end portion of each of the first to fourth arm portions.

12. The biaxial angular velocity sensor according to claim 3, wherein:
a weight portion is integrally formed with a distal end portion of each of the first to fourth arm portions; and
the weight portions each include two protruding portions protruding in a direction from the respective distal end portions of the first to fourth arm portions toward the central portion of the oscillator.

13. The biaxial angular velocity sensor according to claim 4, wherein a weight portion is integrally formed with a distal end portion of each of the first to fourth arm portions.

14. The biaxial angular velocity sensor according to claim 4, wherein:
a weight portion is integrally formed with a distal end portion of each of the first to fourth arm portions; and
the weight portions each include two protruding portions protruding in a direction from the respective distal end portions of the first to fourth arm portions toward the central portion of the oscillator.

15. The biaxial angular velocity sensor according to claim 5, wherein a weight portion is integrally formed with a distal end portion of each of the first to fourth arm portions.

16. The biaxial angular velocity sensor according to claim 5, wherein:
a weight portion is integrally formed with a distal end portion of each of the first to fourth arm portions; and
the weight portions each include two protruding portions protruding in a direction from the respective distal end portions of the first to fourth arm portions toward the central portion of the oscillator.

17. The biaxial angular velocity sensor according to claim 6, wherein a weight portion is integrally formed with a distal end portion of each of the first to fourth arm portions.

18. The biaxial angular velocity sensor according to claim 6, wherein:
a weight portion is integrally formed with a distal end portion of each of the first to fourth arm portions; and
the weight portions each include two protruding portions protruding in a direction from the respective distal end portions of the first to fourth arm portions toward the central portion of the oscillator.

* * * * *